US009642393B2

(12) United States Patent
Mele

(10) Patent No.: US 9,642,393 B2
(45) Date of Patent: May 9, 2017

(54) MOULD FOR MAKING STUFFED OR FILLED FOOD PRODUCTS, IN PARTICULAR SICILIAN ARANCINI

(71) Applicant: Maria Nella Mele, Chiaramonte Gulfi (IT)

(72) Inventor: Maria Nella Mele, Chiaramonte Gulfi (IT)

( * ) Notice: Subject to any disclaimer, the term of this patent is extended or adjusted under 35 U.S.C. 154(b) by 0 days.

(21) Appl. No.: 14/646,997

(22) PCT Filed: Nov. 19, 2013

(86) PCT No.: PCT/IB2013/060239
§ 371 (c)(1),
(2) Date: May 22, 2015

(87) PCT Pub. No.: WO2014/080335
PCT Pub. Date: May 30, 2014

(65) Prior Publication Data
US 2015/0296866 A1  Oct. 22, 2015

(30) Foreign Application Priority Data
Nov. 26, 2012 (IT) .............. RG20120004 U
Aug. 13, 2013 (IT) .............. RM2013A0476

(51) Int. Cl.
A47J 43/20 (2006.01)
A23P 1/10 (2006.01)
A23P 20/25 (2016.01)
A23P 30/10 (2016.01)

(52) U.S. Cl.
CPC .............. *A23P 1/105* (2013.01); *A23P 20/25* (2016.08); *A23P 30/10* (2016.08); *A47J 43/20* (2013.01)

(58) Field of Classification Search
CPC  A23P 1/087; A23P 1/105; A23P 30/10; A23P 20/25; A47J 43/20
USPC ....... 425/401, 112, 193, 283, 352, 398, 412, 425/420, 441, 812, 89; 249/122, 141, 249/151, 160, 173
See application file for complete search history.

(56) References Cited

U.S. PATENT DOCUMENTS 2,619,050 A * 11/1952 Forbes ................ A23G 3/0268
425/410
4,437,826 A    3/1984 Tezuka
4,579,745 A *  4/1986 Mei Sue .............. A21C 11/006
264/163
(Continued)

FOREIGN PATENT DOCUMENTS

AU           638590 B2     7/1993

OTHER PUBLICATIONS

International Search Report mailed on Apr. 17, 2014.

*Primary Examiner* — Seyed Masoud Malekzadeh
(74) *Attorney, Agent, or Firm* — Hershkovitz & Associates, PLLC; Abe Hershkovitz

(57) ABSTRACT

Mould for making stuffed or filled food products, in particular Sicilian arancini, comprising a base (1), a sleeve (2) and a stud (3), the base (1) being provided with a cavity (10) having an aperture facing outwards, the sleeve (2) having a first aperture (20) and a second aperture (21) and being configured to be removably coupled to the base (1) in correspondence with the aperture of the cavity (10) of the latter so as to direct the second aperture (21) outwards, the stud (3) being configured to insert into the second aperture (21) of the sleeve (2).

14 Claims, 4 Drawing Sheets

(56) References Cited

U.S. PATENT DOCUMENTS

| | | | | |
|---|---|---|---|---|
| 5,246,721 A | * | 9/1993 | Kerkonian | A23P 30/10 |
| | | | | 425/412 |
| 5,635,230 A | * | 6/1997 | Aasted | A23G 1/207 |
| | | | | 425/262 |
| 8,038,118 B1 | | 10/2011 | Ajakie | |
| 8,268,374 B2 | * | 9/2012 | Capodieci | A23N 17/005 |
| | | | | 426/245 |
| 8,506,283 B1 | * | 8/2013 | Gonzales | B30B 11/02 |
| | | | | 249/122 |
| 8,701,552 B2 | * | 4/2014 | Hanson | A47J 43/20 |
| | | | | 249/158 |
| 2003/0041743 A1 | * | 3/2003 | Capodieci | A21C 11/006 |
| | | | | 99/353 |
| 2010/0107900 A1 | | 5/2010 | Hanson | |
| 2011/0111104 A1 | | 5/2011 | Thompson et al. | |
| 2013/0084360 A1 | * | 4/2013 | Capodieci | A23L 1/0252 |
| | | | | 426/61 |

\* cited by examiner

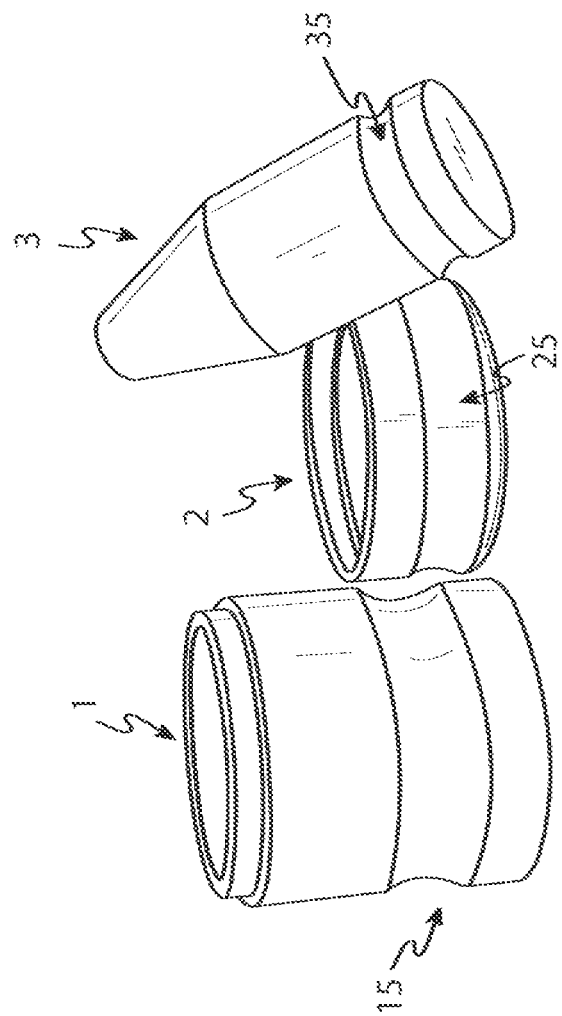
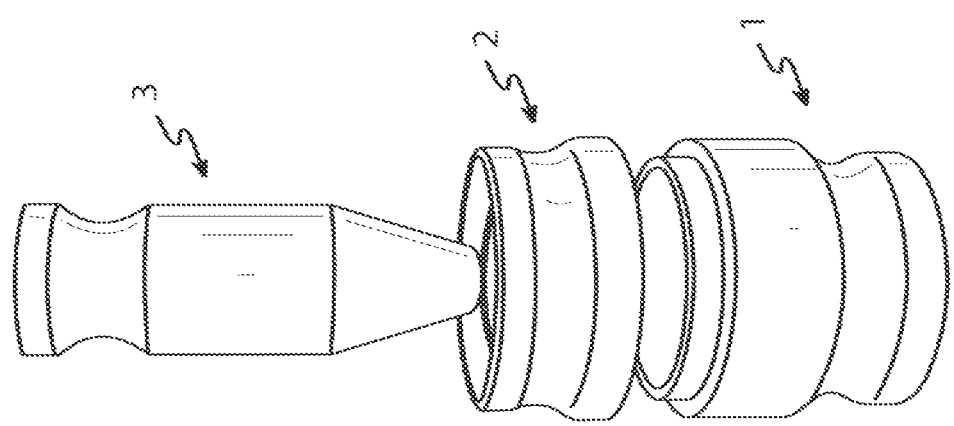

MOULD FOR MAKING STUFFED OR FILLED FOOD PRODUCTS, IN PARTICULAR SICILIAN ARANCINI

CROSS-REFERENCE TO THE RELATED APPLICATIONS

This application is a U.S. National phase of International Application PCT/IB2013/060239filed on Nov. 19, 2013, which claims priority from Italian Applications RG2012U000004, filed on Nov. 26, 2012 and RM2013A000476 filed on Aug. 13, 2013, the disclosures of which are incorporated by reference herein in their entireties.

BACKGROUND OF THE INVENTION

The present invention relates to a mould (also called matrix) for making stuffed or filled food products, such as for instance stuffed or filled rice-based food products, in particular Sicilian arancini, that allows in a simple, reliable, efficient and inexpensive to manually make such food products by reducing the production times and increasing the homogeneity of the made products.

Also, by inserting a mould or more preferably a plurality of moulds according to the invention in an apparatus provided with at least partially automated devices of mechanical handling, the mould according to the invention is capable to allow the production of such food products in an at least partially automated way, allowing small household appliances to be made.

In the following of the present description reference will be mainly made to Sicilian arancini as stuffed or filled food products which may be made with the mould according to the invention. However, it should be considered that the mould according to the invention may be also used for making other stuffed or filled food products, such as for instance stuffed or filled rice-based food products as suppli or filled rice balls, possibly through a simple modification of the shape of the mould according to the invention, still remaining within the scope of protection of the present invention. The arancino is a typical product of Sicilian gastronomy that is widespread in all its variants and known even outside the boundaries of Sicily.

It is known that housewives make the typical Sicilian arancini manually, but this entails a series of manipulations not easy to make, which not everybody is capable to make, given the inhomogeneity of the material of which the arancino is make. This entails a waste of time and arancini not of the same weight and shape.

SUMMARY OF THE INVENTION

It is a first object of this invention to provide for a tool that does not have the classical drawbacks mentioned above and that is particularly simple and reliable. Therefore, the proposed tool allows the household production of the product, even for inexperienced people, and furthermore the use of the invention also by small bars or takeaways and artisans in the field.

It is a another object of this invention to provide for a tool having a structure easier to use than the usual moulds, that most of all permits to simplify the phase of moulding without the help of grooves, holes or air vents, further ensuring a greater safety of hygiene.

It is specific subject-matter of the present invention a mould for making stuffed or filled food products, in particular Sicilian arancini, comprising a base, a sleeve and a stud, the base being provided with a cavity having an aperture facing outwards, the sleeve having a first aperture and a second aperture and being configured to be removably coupled to the base in correspondence with the aperture of the cavity of the latter so as to direct the second aperture outwards, the stud being configured to insert into the second aperture of the sleeve.

This entails that, when they are removably coupled, the base and the sleeve define a whole internal cavity the surface of which defines the external shape of the food product that is intended to make (with the exception of the second aperture of the sleeve that is not closed).

According to another aspect of the invention, the aperture of the cavity of the base may be provided with first mechanical means configured to interact with second mechanical means with which the first aperture of the sleeve is provided, whereby the sleeve is configured to removably couple to the base through the interaction of said first and second mechanical means.

According to a further aspect of the invention, said first mechanical means may comprise a first collar delimiting the aperture of the cavity of the base and defining a first edge, and said second mechanical means may comprise a second collar delimiting the first aperture of the sleeve and defining a second edge, the first collar being configured to interact with the second edge and/or the second collar being configured to interact with the first edge.

According to an additional aspect of the invention, the first collar may be configured to insert inside the second collar.

According to another aspect of the invention, when the sleeve is removably coupled to the base, a junction between an internal surface of the cavity of the base and an internal surface of the sleeve may have no breaks of continuity.

According to a further aspect of the invention, the base and the sleeve may have smooth internal surfaces.

According to an additional aspect of the invention, the base, the sleeve and the stud may be shaped according to shapes with cylindrical symmetry, whereby the aperture of the cavity of the base and the first and the second aperture of the sleeve are circular apertures, the stud optionally having a tapered end and a cylindrical central portion having a cylindrical side surface with a diameter equal to or lower than an internal diameter of the second aperture of the sleeve.

According to another aspect of the invention, the cavity of the base may have ogival shape in longitudinal cross-section.

According to a further aspect of the invention, the sleeve may have an internal shape such that the second aperture has area lower than the area of the first aperture.

According to an additional aspect of the invention, the base, the sleeve and the stud may be provided with respective side grooves.

It is still specific subject-matter of the present invention a process for making stuffed or filled food products, in particular Sicilian arancini, through a mould for making stuffed or filled food products as previously described, comprising the following steps:

A. filling the cavity of the base with food material, in particular rice;
B. removably coupling the sleeve to the base in correspondence with the aperture of the cavity of the latter so as to direct the second aperture outwards,
C. introducing the stud into the second aperture of the sleeve, whereby the food material distributes inside the sleeve and a cavity is created inside the food material;
D. placing a stuffing in the cavity inside the food material;
E. closing the cavity inside the food material with the same food material, by optionally pressing the same with the stud, whereby inside the mould a food product is made;

F. removing the sleeve from the base; and

G. sliding the food product out of the cavity of the base.

As stated above, the present invention refers to a mould intended for making arancini (or other stuffed or filled food products, such as for instance stuffed or filled rice-based food products) with characteristics equal to those of an industrial production. In other words, the mould according to the invention is specifically adapted to make arancini, but it may be also adapted to make other stuffed or filled food products, such as for instance stuffed or filled rice-based food products.

In particular, the mould according to the invention is intended for creating food products equal or similar to the typical Sicilian arancino and it is configured to create, thanks to a stud, a cavity inside the material of the food product, e.g. the rice, which cavity is assigned to house the stuffing. Such stud has the function of distributing the rice within the sleeve, that is removably coupled to the base, by advantageously placing the base on a plane and laying the sleeve over the same, whereby the mould gives to the arancino the characteristic shape with a rounded base.

Advantageously, the base and the sleeve have smooth internal surfaces, and allow a methodology of moulding the finished product (e.g. the arancino) by removing the sleeve, overturning the base and sliding the finished product out of the same base, without adding oils or using compressed air or valves or air vents.

The aforementioned objects, as well as other objects illustrated later and/or evident to those skilled in the art, are reached by the mould according to the present invention through which it is possible obtain an arancino (or other stuffed or filled food product, such as for instance a stuffed or filled rice-based food product) that is regular in shape and weight with respect to that obtainable through the prior art.

Also, the mould according to the invention has a realization structure of simple construction allowing to vary shape and size of the same mould and, consequently, of the food product that is made. The mould comprises three pieces obtained from material for food, optionally obtained thanks to turning or moulding.

BRIEF DESCRIPTION OF THE DRAWINGS

The present invention will be now described, by way of illustration and not by way of limitation, according to its preferred embodiments, by particularly referring to the Figures of the annexed drawings, in which:

FIG. 1 shows a first perspective view of the three elements of a preferred embodiment of the mould according to the invention;

FIG. 3 shows a second perspective view of the three elements of the mould of FIG. 1;

DETAILED DESCRIPTION OF THE INVENTION

Figure 2:
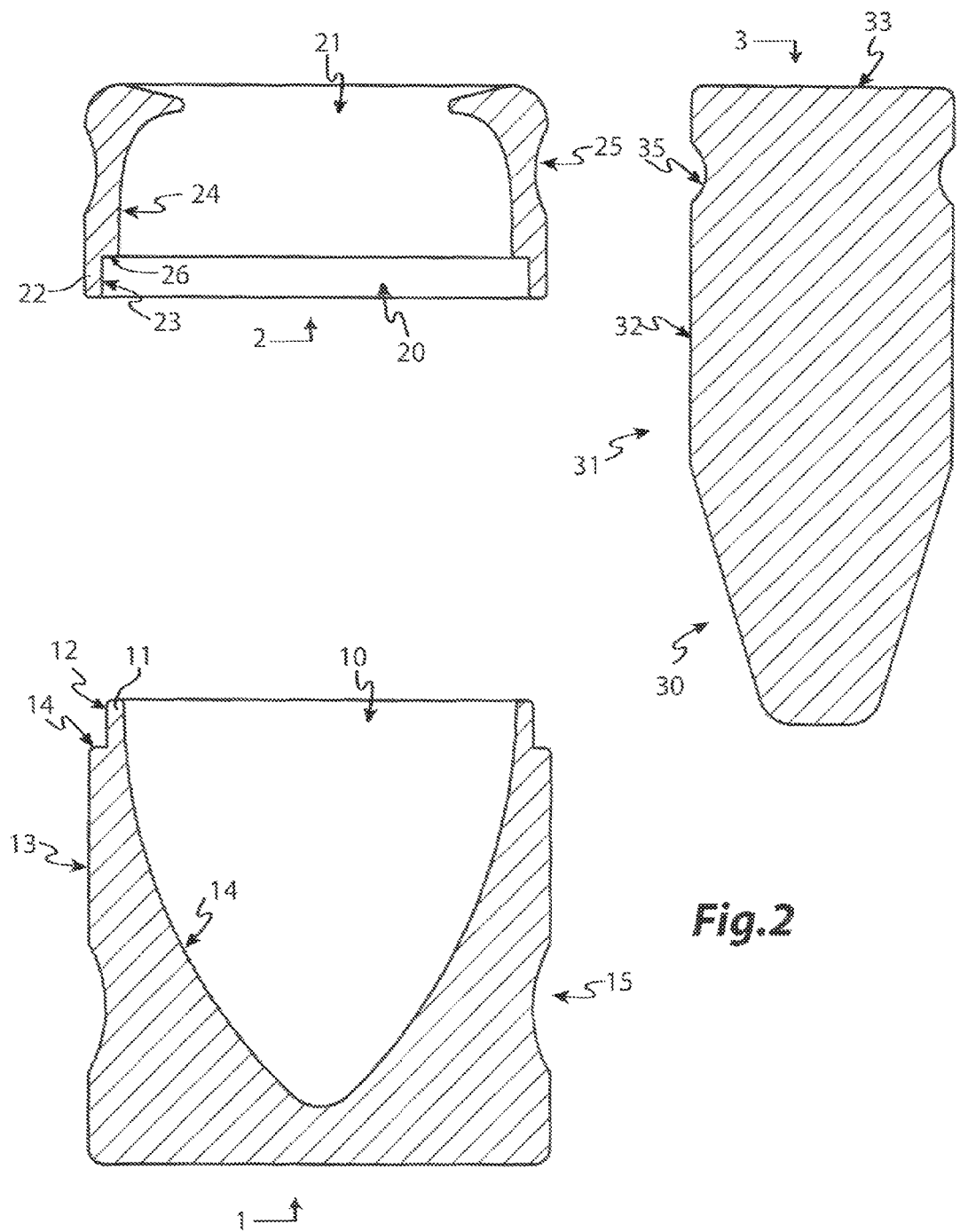
FIG. 2 shows a cross-sectional view of the three elements of the mould of FIG. 1.

In the Figures identical reference numerals will be used for alike elements.

Making reference to the Figures, it may be observed that a preferred embodiment of the mould according to the invention comprises three elements, optionally shaped according to shapes with cylindrical symmetry: a base 1, a sleeve 2 and a stud 3.

The base 1 is shaped so as to have a cavity 10 of ogival shape (in axial cross-section, see FIG. 2) having an aperture, optionally circular (in plan view), facing outwards (whereby, when the base 1 is laid on a plane, the aperture of the cavity 10 is directed upwards). The aperture of the cavity 10 is delimited by a collar 11 the external cylindrical surface 12 of which has a diameter that is lower than the diameter of the cylindrical side surface 13 of the body of the base 1.

The sleeve 2 is hollow and has a first aperture 20 and a second aperture 21. In particular, the sleeve has an internal shape such that the second aperture 21 has internal diameter lower than the internal diameter of the first aperture 20 (i.e. the area of the second aperture 21 is lower than the area of the first aperture 20), although such feature is not essential for the invention. The first aperture 20 corresponds (in plan view) to the aperture of the cavity 10, whereby in the preferred embodiment of the mould according to the invention shown in the Figures it is circular (in plan view). The first aperture 20 is delimited by a collar 22 the internal cylindrical surface 23 of which has a diameter that is lower than that of the end of the internal cylindrical surface 24 of the sleeve 2 adjacent to the collar 22, so as to define an edge 26 joining the internal cylindrical surface 23 of the collar 22 and the internal cylindrical surface 24 of the sleeve 2; in particular, the diameter of the internal cylindrical surface 23 of the collar 22 corresponds to the diameter of the external cylindrical surface 12 of the collar 11 delimiting the aperture of the cavity 20 of the base 1. In other words, as show in detail in FIGS. 5 and 6, the collar 22 of the first aperture 20 of the sleeve 2 is configured to interact with the collar 11 of the aperture of the cavity 20 of the base 1, whereby the sleeve 2 is configured to removably couple to the base 1, so that the sleeve steadily lays on the base 1 thanks to the collar 11 that inserts within the collar 22 (i.e. so that the collar 22 lays on the surface of the edge 14 joining the external cylindrical surface 12 of the collar 11 and the external cylindrical surface 13 of the body of the base 1) and so as to direct the second aperture 21 outwards; advantageously, also the collar 11 interacts with the edge 26 of the sleeve 2 (possibly, the interaction of the collar 11 with the edge 26 may replace the interaction of the collar 22 with the edge 14, implementing the removable coupling of the base 1 and sleeve 2). Preferably, when the sleeve 2 is steadily laid on the base 1, the junction of the internal surface 14 of the cavity 10 and of the internal surface 24 of the sleeve 2 has substantially no breaks of continuity; however, such feature is not essential for the invention (depending on the external shape that is desired for the food product that is made by the mould). Advantageously, the base 1 and the sleeve 2 have smooth internal surfaces.

Figure 5:
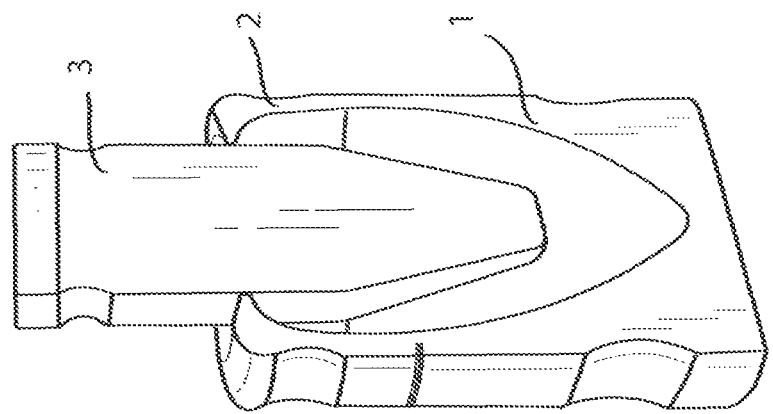
FIG. 5 shows a partially cross-sectional perspective view of the mould of FIG. 4.
Figure 4:
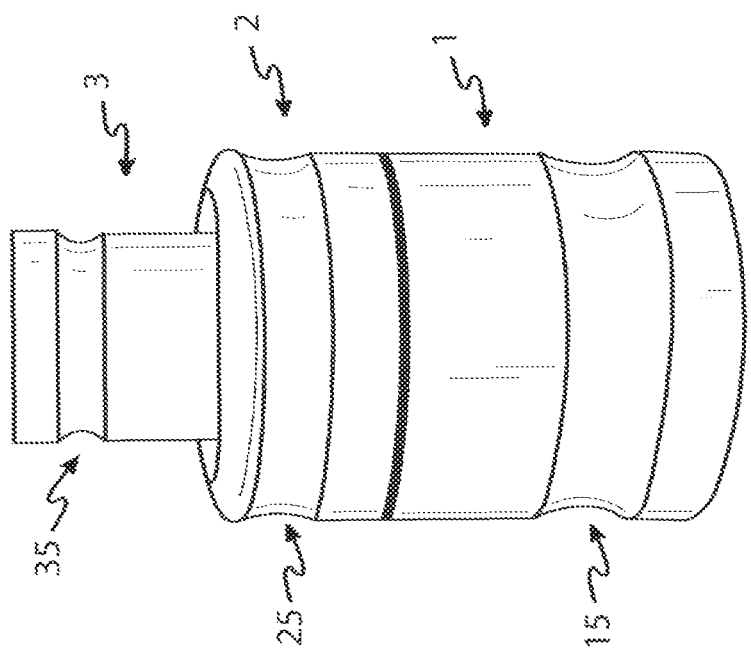
FIG. 4 shows a third perspective view of the three elements of the mould of FIG. 1 in an interaction configuration.
Figure 6:
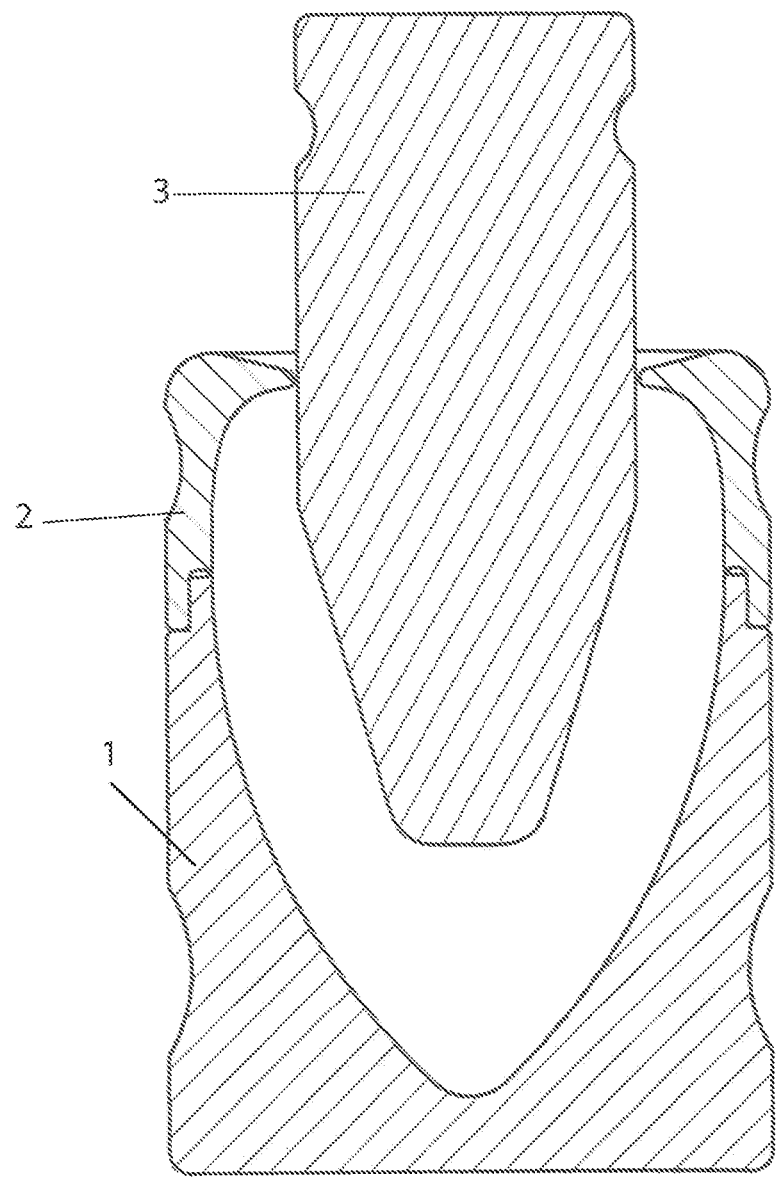
FIG. 6 shows a cross-sectional view of the mould of FIG. 4.

The stud 3 is shaped so as to be configured to insert into the second aperture 21 of the sleeve 2 so that, when the sleeve 2 is steadily laid on the base 1, the stud 3 may cross the sleeve 2, exiting from the first aperture 20 of the latter, and partially inserting into the aperture of the cavity 10 of the base 1, as shown in greater detail in FIGS. 5 and 6. In particular, the stud 3 has optionally an end 30 that is tapered and a central portion 31 that is substantially cylindrical, the cylindrical side surface 32 of which has a diameter corresponding to (preferably equal to or lower than) the internal diameter of the second aperture 21 of the sleeve 2.

Making specific reference to FIGS. 3-6, it may be observed that, as stated above, it is possible to lodge the sleeve 2 on the base 1 and that it is possible to introduce the stud 3 into the second aperture 21 of the sleeve.

In particular, the base 1, the sleeve 2 and the stud 3 may be obtained through turning or moulding.

In order to better understand the mould according to the invention, the modes of use and operation of the preferred embodiment of the mould shown in the Figures are illustrated in the following, similar modes being valid for the other embodiments.

Initially, the material of which the finished food product will be made is placed in the cavity 10 of ogival shape of the base 1; in particular, in the case where an arancino is made, rice is placed in the cavity 10. Afterwards, the sleeve 2 is laid on the base 1 and, finally, the end 30 of the stud 3 is introduced into the second aperture 21 of the sleeve. In this way, the stud 3 presses the rice placed in the cavity 10 of the base 1 and, consequently, it distributes the same rice also within the sleeve 2 thus forming the base of the arancino; moreover, the introduction of the stud 3 creates the space in the rice (i.e. a cavity inside the rice of the arancino) necessary for housing the stuffing. Finally, the base of the arancino, housed within the sleeve 2, is closed with further rice advantageously pressed through the stud 3 (preferably through the flat bottom 33 of the stud 3). Once that the arancino has been closed, the sleeve 2 is removed from the base 1 (advantageously after having oriented the base 1-sleeve 2 assembly with the base 1 positioned under the sleeve 2) and the resulting arancino is slid out of the cavity 10 of the base 1 (advantageously by overturning the base 1 on a plane).

In order to better allow handling of the base 1, sleeve 2 and stud 3, these are provided with respective side grooves, indicated in the Figures with reference numerals 15, 25 and 35; however, the presence of such side grooves is not an essential for the invention, and the grooves may be replaced with other handling means (such as for instance ridges or knobs).

The base 1, the sleeve 2 and the stud 3 of the mould according to the invention may also have shape different from what shown in FIGS. 1-6 for making arancini, or other stuffed or filled rice-based food products, or other stuffed or filled food products, having different shape and size.

In particular, other embodiments of the mould according to the invention may comprise a base, a sleeve and/or a stud which have not a shape with cylindrical symmetry; in this case, for instance, the aperture of the cavity of the base and the corresponding first aperture of the sleeve may have a shape (in plan view) different from the circular shape.

Also, the ogival shape (in axial or more generally longitudinal cross-section) of the cavity 10 of the base 1 is not an essential feature for the invention, and further embodiments of the mould according to the invention may have cavities of the base with different shapes.

Other embodiments of the mould according to the invention may comprise a sleeve having an internal shape different from what illustrated in the Figures; by way of example, the second aperture may have internal diameter identical to or larger than the internal diameter of the first aperture (and in this case the stud may have an accordingly different shape, e.g. that is tapered for the entire length of the stud).

Further embodiments of the mould according to the invention may comprise mechanical means of interaction between base and sleeve different from the collars 11 and 22 shown in the Figures. By way of example, and not by way of limitation, the collar of the first aperture of the sleeve could insert within the collar of the aperture of the cavity of the base, and it could lay on an internal edge of the collar of the aperture of the cavity of the base. Moreover, at least one of the two collars could have ridges, optionally radial ridges, configured to insert into corresponding grooves of the other collar. Alternatively, the base and/or the sleeve could comprise a collar inserting into a corresponding groove of the sleeve and/or of the base.

Other embodiments of the mould according to the invention may comprise a stud having a different shape, for instance wherein the end is not tapered.

The mould according to the invention permits to obtain stuffed or filled food products, such as for instance stuffed or filled rice-based food products, in particular Sicilian arancini, having identical shape and weight.

This occurs without adding oils and without the aid of compressed air or air vents or valves which during the preparation of the food products could clog up and hinder the slide of the food product, in particular the arancino, additionally becoming a bacterial receptacle. Therefore, the absence of grooves or holes also ensures a higher guarantee of hygiene rendering the mould easily washable.

The mould according to the invention allows stuffed or filled food products, in particular arancini, to be manually made without the aid of automated mechanisms.

However, by inserting a mould or more preferably a plurality of moulds according to the invention in an apparatus provided with devices at least partially automated of mechanical handling, the mould according to the invention allows such food products to be made also in an at least partially automated way, allowing small household appliances to be made.

The preferred embodiments of this invention have been described and a number of variations have been suggested hereinbefore, but it should be understood that those skilled in the art can make variations and changes, without so departing from the scope of protection thereof, as defined by the attached claims.

The invention claimed is:

1. A mould for making stuffed or filled food products, comprising a base, a sleeve and a stud, the base being provided with a cavity having an aperture facing outwardly, the sleeve having a first aperture and a second aperture and being configured to be removably coupled to the base in correspondence with the aperture of the cavity of the base so as to direct the second aperture outwardly, the stud being configured to be inserted into the second aperture of the sleeve and exit from the first aperture of the sleeve wherein the stud has a tapered portion such that the stud has a diameter corresponding to an internal diameter of the second aperture of the sleeve, the base forming one end of the cavity and the sleeve forming another end of the cavity, wherein the aperture of the cavity of the base is provided with first mechanical means configured to interact with second mechanical means provided on the first aperture of the sleeve, and wherein said first mechanical means comprises a first collar delimiting the aperture of the cavity of the base and defining a first edge, and wherein said second mechanical means comprises a second collar delimiting the first aperture of the sleeve and defining a second edge, at least one of, (a) the first collar being configured to interact with the second edge and to be inserted within the second collar and (b) the second collar being configured to interact with the first edge and to be inserted within the first collar.

2. The mould according to claim 1, wherein the sleeve is configured to be removably coupled to the base through the interaction of said first and second mechanical means.

3. The mould according to claim 1, wherein, when the sleeve is removably coupled to the base, an internal surface of the cavity of the base continues with an internal surface of the sleeve.

4. The mould according to claim 1, wherein the base and the sleeve have relatively smooth internal surfaces.

5. The mould according to claim 1, wherein the base, the sleeve and the stud are shaped with cylindrical symmetry, whereby the aperture of the cavity of the base and the first and the second aperture of the sleeve are circular apertures.

6. The mould according to claim 1, wherein the cavity of the base has an ogival shape in longitudinal cross-section.

7. The mould according to claim 1, wherein the sleeve has an internal shape such that the second aperture has a smaller diameter than a diameter of the first aperture.

8. The mould according to claim 1, wherein the base, the sleeve and the stud are provided with respective side grooves.

9. A process for making stuffed or filled food products through a mould, the mould comprising a base, a sleeve and a stud, the base being provided with a first cavity having an aperture facing outwardly, the sleeve having a first aperture and a second aperture and being configured to be removably coupled to the base in correspondence with the aperture of the first cavity so as to direct the second aperture outwardly, the stud being configured to be inserted into the second aperture of the sleeve and exit from the first aperture of the sleeve wherein the stud has a tapered portion such that the stud has a diameter corresponding to an internal diameter of the second aperture of the sleeve, the base forming one end of the first cavity and the sleeve forming another end of the first cavity, wherein the aperture of the cavity of the base is provided with first mechanical means configured to interact with second mechanical means provided on the first aperture of the sleeve, and wherein said first mechanical means comprises a first collar delimiting the aperture of the cavity of the base and defining a first edge, and wherein said second mechanical means comprises a second collar delimiting the first aperture of the sleeve and defining a second edge, at least one of, (a) the first collar being configured to interact with the second edge and to be inserted within the second collar and (b) the second collar being configured to interact with the first edge and to be inserted within the first collar, wherein the process comprises:

A. filling the first cavity with food material;
   B. removably coupling the sleeve to the base in correspondence with the aperture of the first cavity so as to direct the second aperture outwardly,
   C. introducing the stud into the second aperture of the sleeve, whereby the food material distributes inside the sleeve and a second cavity is created inside the food material;
   D. placing a stuffing in the second cavity;
   E. closing the second cavity with the same food material, whereby a food product is made inside the mould;
   F. removing the sleeve from the base; and
   G. sliding the food product out of the first cavity.

10. The mould according to claim 1, wherein the stuffed or filled food products are Sicilian arancini.

11. The process according to claim 9, wherein the food material with which the first cavity is filled is rice.

12. The process according to claim 9, wherein the second cavity is closed with the same food material by pressing the food material with the stud.

13. The process according to claim 9, wherein the stuffed or filled food products are Sicilian arancini.

14. The mould according to claim 1, wherein the stud is void of any apertures therethrough.

* * * * *